US007907594B2

(12) United States Patent
Wu et al.

(10) Patent No.: US 7,907,594 B2
(45) Date of Patent: Mar. 15, 2011

(54) MARKING KEYFRAMES FOR A COMMUNICATION SESSION

(75) Inventors: Duanpei Wu, San Jose, CA (US); Walter R. Friedrich, Pleasanton, CA (US); Shantanu Sarkar, San Jose, CA (US); Steven G. Fry, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 11/421,622

(22) Filed: Jun. 1, 2006

(65) Prior Publication Data
US 2007/0280194 A1    Dec. 6, 2007

(51) Int. Cl.
*H04L 12/28* (2006.01)

(52) U.S. Cl. .......... 370/351; 370/60; 370/352; 379/158; 379/327; 348/14.08; 348/14.09; 348/14.12

(58) Field of Classification Search .............. 379/60, 379/158, 327; 348/14.1, 14.08, 14.09, 14.12; 370/60, 351, 352
See application file for complete search history.

(56) References Cited

U.S. PATENT DOCUMENTS

| | | | |
|---|---|---|---|
| 4,574,374 A | | 3/1986 | Scordo |
| 4,701,906 A | * | 10/1987 | Ransom et al. ............... 370/355 |
| 4,703,475 A | * | 10/1987 | Dretzka et al. ............... 370/394 |
| 5,007,046 A | | 4/1991 | Erving et al. |
| 5,058,153 A | | 10/1991 | Carew et al. |
| 5,151,899 A | * | 9/1992 | Thomas et al. ............... 370/394 |
| 5,848,098 A | | 12/1998 | Cheng et al. |
| 6,078,809 A | | 6/2000 | Proctor |
| 6,128,649 A | | 10/2000 | Smith et al. |
| 6,148,068 A | | 11/2000 | Lowery et al. |
| 6,535,604 B1 | | 3/2003 | Provencal et al. |
| 6,989,856 B2 | | 1/2006 | Firestone et al. |
| 7,061,873 B2 | | 6/2006 | Ito et al. |
| 7,113,992 B1 | | 9/2006 | Even |
| 7,362,350 B2 | * | 4/2008 | Cutler ......................... 348/14.12 |
| 2002/0065928 A1 | * | 5/2002 | Senga et al. .................. 709/231 |
| 2002/0080752 A1 | | 6/2002 | Johansson et al. |
| 2003/0081607 A1 | | 5/2003 | Kavanagh |
| 2004/0047342 A1 | * | 3/2004 | Gavish et al. ................. 370/352 |
| 2004/0252761 A1 | | 12/2004 | Brown et al. |
| 2005/0033758 A1 | * | 2/2005 | Baxter ......................... 707/100 |
| 2005/0122942 A1 | | 6/2005 | Rhee et al. |
| 2005/0165928 A1 | | 7/2005 | Shu et al. |
| 2005/0281205 A1 | | 12/2005 | Chandwadkar et al. |
| 2006/0293073 A1 | | 12/2006 | Rengaraju et al. |

OTHER PUBLICATIONS

Pending U.S. Appl. No. 11/210,325, entitled, "*System and Method for Performing Distributed Multipoint Video Conferencing*", 43 pages specification, claims and abstract, 5 pages of drawings, inventors Randall B. Baird, et al, filed Aug. 24, 2005.
"*Videoconferencing*", from Wikipedia, the free encyclopedia, http://en.wikipedia.org/wiki/Video_conference, pp. 1-5, Printed Feb. 13, 2006.

(Continued)

*Primary Examiner* — Melur Ramakrishnaiah
*Assistant Examiner* — Yosef K Laekemariam
(74) *Attorney, Agent, or Firm* — Baker Botts L.L.P.

(57) ABSTRACT

Marking a keyframe of a media stream in a communication system involves one or more entry media switches in communication with one or more endpoints. An entry media switch receives a media stream from an endpoint, where the media stream comprises a sequence of packets with a keyframe. The keyframe is detected and marked with a keyframe indicator. The keyframe indicator is operable to notify a downstream device of the keyframe. An output media stream is outputted.

21 Claims, 3 Drawing Sheets

OTHER PUBLICATIONS

Cisco IOS Mobile Wireless Configuration Guide, Chapter 11, Configuring Load Balancing on the GGSN, www.cisco.com, pp. 11-1-11-28, Printed Feb. 2006.

Cisco IOS Mobile Wireless Configuration Guide, Configuring Load Balancing on the GGSN, www.cisco.com, pp. MWC-221-MWC-238, Printed Feb. 2006.

USPTO; Office Action dated May 4, 2009 for U.S. Appl. No. 11/210,325, filed Aug. 24, 2005 in the name of Randall B. Baird, 10 pages, May 4, 2009.

USPTO; Final Office Action dated Nov. 4, 2009 for U.S. Appl. No. 11/210,325, filed Aug. 24, 2005 in the name of Randall B. Baird, 10 pages, Nov. 4, 2009.

USPTO; Notice of Allowance and Fee(s) Due dated Apr. 8, 2010 for U.S. Appl. No. 11/210,325, filed Aug. 24, 2005 in the name of Randall B. Baird, 6 pages, Apr. 8, 2010.

* cited by examiner

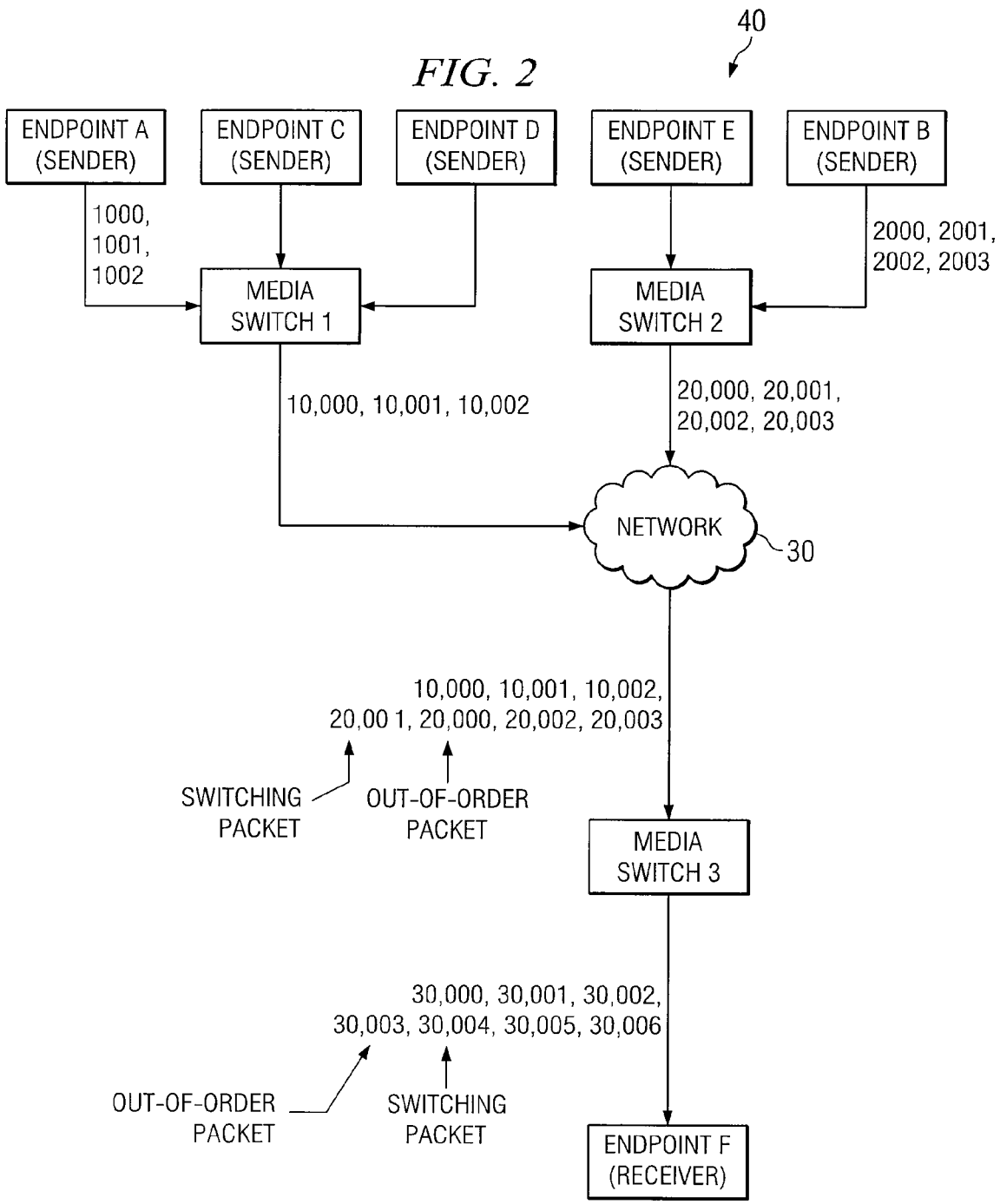

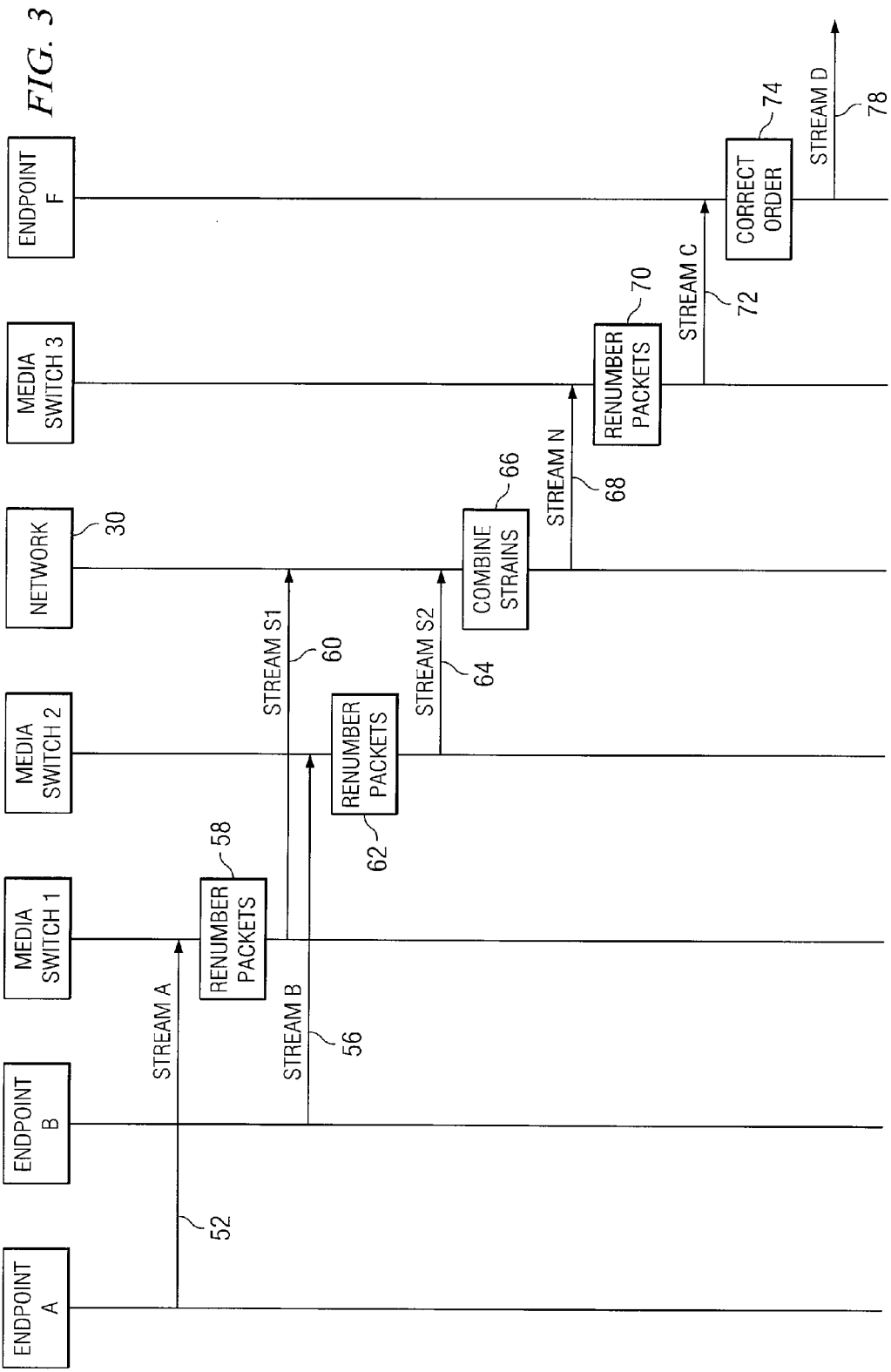

MARKING KEYFRAMES FOR A COMMUNICATION SESSION

TECHNICAL FIELD OF THE INVENTION

This invention relates in general to the field of communications and, more particularly, to a system and method for marking keyframes for a communication session.

BACKGROUND OF THE INVENTION

Conferencing systems provide for communication sessions among two or more endpoints. A known approach to conferencing uses a centralized multipoint control unit (MCU) architecture to connect calls from several endpoints. In a centralized MCU architecture, media streams from endpoints are sent to the central media mixer. The central media mixer combines the media streams into one combined media stream and sends the combined media stream to media switches for distribution to the endpoints.

This known approach for conferencing, however, is not efficient in certain situations. It is generally desirable to have efficient techniques for conferencing.

SUMMARY OF THE INVENTION

In accordance with the present invention, disadvantages and problems associated with previous techniques for marking keyframes may be reduced or eliminated.

According to one embodiment of the present invention, marking a keyframe of a media stream in a communication system involves one or more entry media switches in communication with one or more endpoints. An entry media switch receives a media stream from an endpoint, where the media stream comprises a sequence of packets with a keyframe. The keyframe is detected and marked with a keyframe indicator. The keyframe indicator is operable to notify a downstream device of the keyframe. An output media stream is outputted.

Certain embodiments of the present invention may provide a number of technical advantages. A technical advantage of one embodiment may be that an entry media switch examines a stream to identify keyframes. When a keyframe is detected, the entry media switch marks the keyframe to notify non-entry media switches of the keyframe. Thus, non-entry media switches do not have to examine the stream for keyframes.

Another technical advantage of one embodiment may be that a subsequent non-entry entry media switch renumbers the packets in a sequential order. Renumbering the packets in a sequential order may reduce the possibility that packets will be dropped. Another technical advantage of one embodiment may be a receiver endpoint applies a reordering scheme to return the packets to the original order.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description, taken in conjunction with the accompanying drawings, in which:

FIG. 2 is a block diagram illustrating a system for marking keyframes that may be used with the communication system of FIG. 1, in accordance with one embodiment of the present invention; and FIG. 3 is a call flow diagram illustrating a method for marking keyframes that may be used with the system of FIG. 2, in accordance with one embodiment of the present invention.

DETAILED DESCRIPTION OF THE INVENTION

Figure 1:
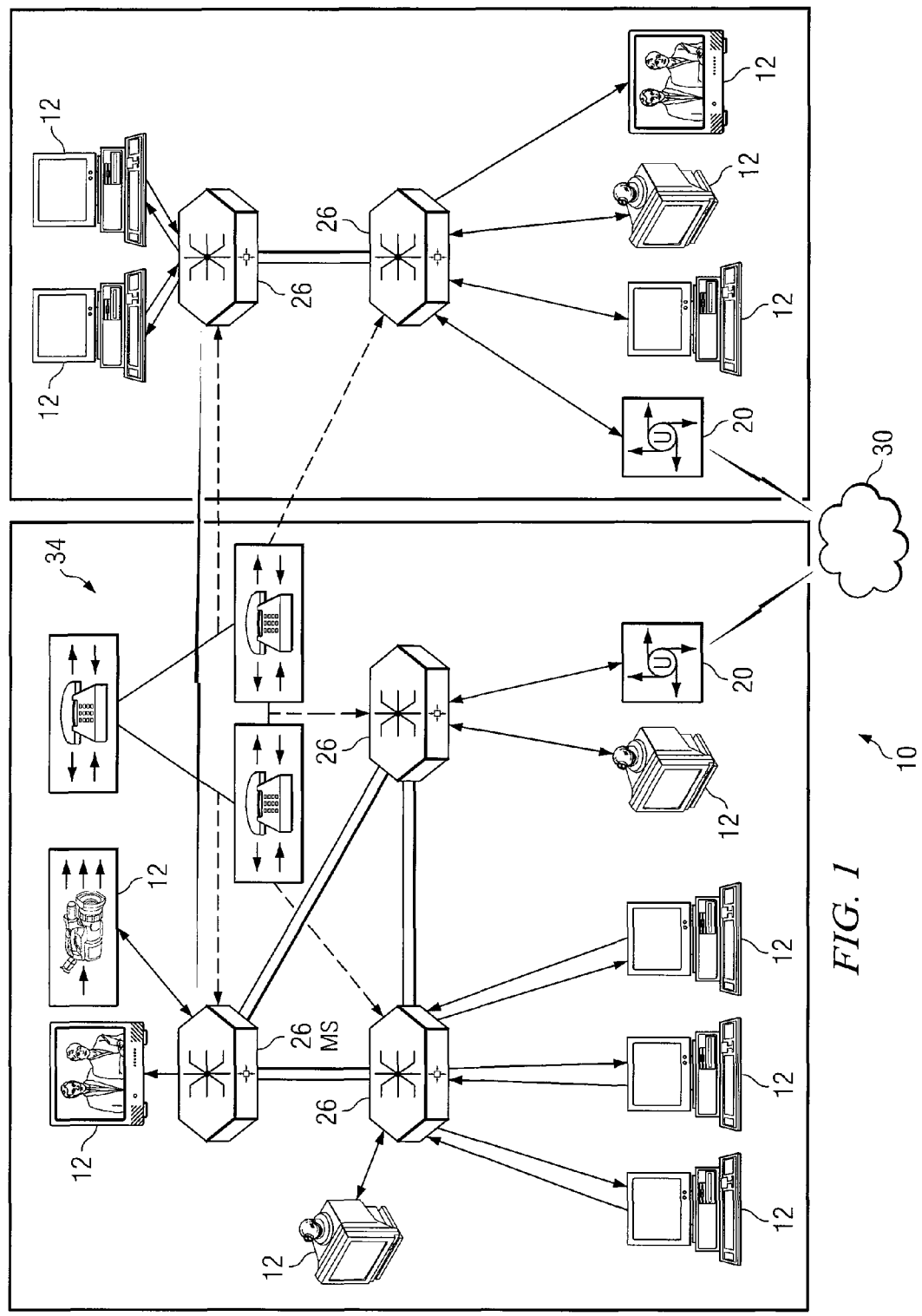
FIG. 1 is a block diagram illustrating a communication system for facilitating conferencing, in accordance with one embodiment of the present invention.

FIG. 1 is a block diagram illustrating a communication system 10 for facilitating conferencing, in accordance with one embodiment of the present invention. According to the embodiment, an entry media switch of communication system 10 receives media streams from sender endpoints. The entry media switch checks each packet in the media streams for keyframes, which indicate an active media stream. When a keyframe is detected, the entry media switch switches to the active stream. The entry media switch also marks the keyframe with a keyframe indicator to notify downstream non-entry media switches of the keyframe. Thus, non-entry media switches do not have to examine the stream for keyframes.

According to the illustrated embodiment, system 10 operates to provide services such as communication sessions to endpoints 12. A communication session may refer to an active communication between endpoints, measured from endpoint to endpoint.

Information is communicated during a communication session. Information may refer to voice, data, text, audio, video, multimedia, control, signaling, other information, or any combination of the preceding. The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication system 10 may facilitate a conference between endpoints 12. A conference may refer to a communication session between two or more endpoints, which simultaneously interact through media transmission. A media stream may refer to a stream of packets that communicate information, such as an audio stream or a video stream. Digital media streams may be subdivided into frames or packets and may be carried using any suitable protocol such as Real-Time Transfer Protocol (RTP) or User Datagram Protocol (UDP).

Media streams may be categorized as fixed or switched. A fixed media stream may originate from the same source for the duration of a conference. A switched media stream may originate from different sources for the duration.

Communication system 10 includes components such as devices. In general, a device may include any suitable arrangement of components operable to perform the operations of the device, and may comprise logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

In the illustrated embodiment, communication system 10 includes one or more endpoints 12, one or more gateways 20, a plurality of media switches 26, a network 30, and a set of call agents 34 coupled as shown. Although FIG. 1 illustrates a particular number and configuration of endpoints, media switches, networks, and gateways, communication system 10 contemplates any number or arrangement of such devices for communicating media. For example, communication system 10 may include any number of suitable applications such as conference managers, conferencing schedulers, user conference controls, directory services, or network management tools.

An endpoint 12 represents any suitable device operable to establish communication sessions with another endpoint 12 or other components of system 10. An endpoint 12 may comprise a telephone, a computer running telephony software, a video monitor, a camera, an IP phone, a cell phone, an IM client, a short message service (SMS) client, or any other suitable device that supports the communication of packets. Endpoints 12 may include unattended or automated systems, gateways, other intermediate components, or other devices for establishing communication sessions.

A gateway 20 represents any suitable device operable to interconnect with network 30. Gateways 20 may convert communications between different communication protocols. For example, gateways 30 may convert communications from a protocol used by network 30 to a different protocol, or vice-versa.

Network 30 represents any suitable communication network that allows devices such as endpoints 12 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

A media switch 26 represents any suitable device operable to switch between media streams of different sources. Switching media streams may involve replicating and transmitting media streams from selected endpoints and suppressing media streams from other endpoints.

Media streams may be switched according to any suitable selection criterion. Selection criteria may be defined by a conference policy. A conference policy may specify the stream to be selected for transmission to endpoints 12. For example, a conference policy may specify that the stream from an endpoint with an active speaker, an endpoint with a person controlling a shared display, or an endpoint selected by a moderator is to be selected. Another conference policy may specify the streams that certain endpoints can received. For example, only media streams with non-confidential information may be transmitted to endpoints 12 without security clearances.

According to one embodiment, media switch functionality may be included as a software feature in network operating systems such as CISCO IOS or CISCO CatOS (provided by CISCO SYSTEMS, INC.) or in any other general purpose operating system. In another example, existing network devices such as routers, gateways, servers, CPUs, bridges, switches, and wireless access points may provide media switch functionality. These functions may be implemented in media switches 26 throughout network 30 or alternatively, implemented in conjunction with a video or audio bridge or combination thereof without the need to utilize any media switch 26.

To smoothly transition from one active stream to another, a media switch may switch streams when it detects a keyframe. A keyframe, also called an intraframe or I-frame, may refer to a frame or a packet in a media stream that may be decoded without reference to any frame other than itself. That is, a keyframe does not require decoding of another frame in order for that frame to be decoded. Other types of frames, such as P-frames and B-frames, require decoding of one or more other frames in order for that frame to be decoded.

Modifications, additions, or omissions may be made to communication system 10 without departing from the scope of the invention. The components of system 10 may be integrated or separated according to particular needs. If any components of communication system 10 are separated, the components may be coupled using any appropriate wire line, wireless, or other link. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating a system 40 for marking keyframes that may be used with communication system 10, in accordance with one embodiment of the present invention. System 40 includes endpoints A through F, media switches 1 through 3, and a network 30 coupled as shown.

In the illustrated embodiment, endpoints A through E are sender endpoints, and endpoint F is a receiver endpoint. A sender endpoint may refer to an endpoint that originates a media stream, and a receiver endpoint may refer to an endpoint that receives a media stream. The sender endpoints may send streams with packets that have endpoint sequence numbers. Endpoint sequence numbers may refer to packet numbers assigned by the sender endpoints. In the illustrated embodiment, sender endpoint A sends media stream A with packets having endpoint sequence numbers $a_i$: $a_1=1000$, $a_2=1001$, and $a_3=1002$. Sender endpoint B sends media stream B with packets having endpoint sequence numbers $b_j$: $b_1=2000$, $b_2=2001$, $b_3=2002$, and $b_4=2003$.

In the illustrated embodiment, media switches 1 and 2 communicate media streams between subnets (that include endpoints A through E) and network 30. A subnet may refer to a group of one or more endpoints associated with one media switch. In the illustrated embodiment, endpoints A, C, and D are part of a first subnet associated with media switch 1, and endpoints E and B are part of a second subnet associated with media switch 2.

An entry media switch may choose an active stream by selecting an endpoint from a subnet. In the illustrated embodiment, media switch 1 selects endpoint A as the active speaker at one time instance, and media switch 2 selects endpoint B as the active speaker at another time instance.

A media switch may switch to a new active speaker when the media switch detects a keyframe. When a keyframe is detected, the media switch may suppress the media streams from non-active speakers so that only the media stream from the active speaker is forwarded. In one embodiment, only entry media switches may detect keyframes.

The entry media switch may mark the keyframes in order to notify downstream non-entry media switches of the keyframes. A keyframe indicator may be used to mark a keyframe. In one embodiment, an RTP header extension embedded in a sequence number may be used to carry a keyframe indicator. A particular value in the header extension may indicate a keyframe. For one example, a "0" may indicate a keyframe.

In one embodiment, the entry media switch may mark the keyframes by renumbering the packet by assigning upstream sequence numbers to the packets. Upstream sequence numbers may refer to the sequence numbers assigned by an entry media switch.

Each entry media switch may use a particular sequence number series. In the illustrated embodiment, media switch 1 uses sequence number series 10,XXX, and media switch 2 uses sequence number series 20,XXX. Media switch 1 renumbers endpoint sequence numbers $a_1$=1000, $a_2$=1001, and $a_3$=1002 to upstream sequence numbers $s1_i$: $s1_1$=10,000, $s1_2$=10,001, and $s1_3$=10,002, respectively. Media switch 2 renumbers endpoint sequence numbers from $b_1$=2000, $b_2$=2001, $b_3$=2002, and $b_4$=2003 to upstream sequence numbers $s2_j$: $s2_1$=20,000, $s2_2$=20,001, $s2_3$=20,002, and $s2_4$=20,003, respectively. In the illustrated example, the RTP header extension of sequence number $n_4$=20,001 is 1.

Entry media switches may communicate the media streams to network 30. In the illustrated embodiment, media switch 1 communicates media stream S1 to network 30, and media switch 2 communicates media stream S2 to network 30. In other embodiments, the media streams may be communicated to any number of system modules. For example, the media streams may be communicated to a controller that screens media streams before sending the media streams to network 30.

In some embodiments, network 30 may combine the media streams into an out-going combined stream. The combined stream may be communicated to non-entry media switches for distribution to receiver endpoints. In the illustrated embodiment, network 30 combines media stream S1 and S2 to form combined stream N.

Network 30 may mix up the order of the packets when combining the media streams. An out-of-order packet may refer to a packet with a sequence number that does not correspond to its order in the sequence. A switching packet may refer to the first packet to arrive from a particular entry media switch. In some embodiments, the switching packet may alert the media switch of a new active stream.

In the illustrated embodiment, network 30 mixes up the order of the packets of combined stream N: $n_1$=10,000, $n_2$=10,001, $n_3$=10,002, $n_4$=20,001, $n_5$=20,000, $n_6$=20,002, and $n_7$=20,003. In this example, for media switch 3, packet $n_4$=20,001 is the first packet from entry media switch 2, so packet $n_4$=20,001 is the switching packet. In the illustrated embodiment, the next packet $n_5$=20,000 has a sequence number smaller than the sequence number of the switching packet $n_4$=20,001, so it is the real first switch packet but it is out of order.

Non-entry media switches may detect keyframes in the combined media stream from the keyframe marking provided by the entry media switches. The non-entry media switches may rely on the keyframe indicators marking the keyframes, and may not need to continuously monitor the packets in the stream for keyframes.

In some embodiments, the non-entry media switches may renumber the packets with downstream sequence numbers. The non-entry media switches may renumber the packets in sequential order according to their arrival at the non-entry media switch. In the illustrated example, media switch 3 renumbers upstream sequence numbers $n_1$=10,000, $n_2$=100,001, $n_3$=10,002, $n_4$=20,001, $n_5$=20,000, $n_6$=20,002, and $n_7$=20,003 to downstream sequence numbers $f_k$: $f_1$=30,000, $f_2$=30,001, $f_3$=30,002, $f_4$=30,003, $f_5$=30,004, $f_6$=30,005, and $f_7$=30,006, respectively. In this example, the out-of-order packet with sequence number $n_5$=20,000 and $n_4$=20,001 have been renumbered to $f_4$=30,003 and $f_5$=30,004, respectively, and they are no longer out of order. Accordingly, the receiver endpoint will probably not drop the packet.

In some embodiments, receiver endpoints may use a reordering scheme to correct the mixed-up order of the packets. The receiver endpoints may correct the downstream sequence numbers of the packets to correspond with the original order of the packets in the active streams originating from the sender endpoints.

In the illustrated embodiment, receiver endpoints calculate corrected downstream sequence numbers $g_k$ from upstream sequence numbers $n_k$ according to the following equation:

$$g_k = n_k - \Delta$$

where $\Delta = n_{sp} - f_{sp} - \text{ext}$

In the example, $\Delta$ represents a correction factor used to correct the order of packets, $n_{sp}$ represents the upstream sequence number of the switching packet of an active stream, $f_{sp}$ represents the downstream sequence number of the switching packet of an active stream, and ext represents the RTP header extension sequence number of the switching packet of an active stream.

In the illustrated embodiment, upstream sequence number $n_{sp}$ for active stream S1 is $n_1$=10,000, and upstream sequence number $n_{sp}$ for active stream S2 is $n_1$=20,001. Downstream sequence number $f_{sp}$ for active stream S1 is $n_1$=30,000, and downstream sequence number $f_{sp}$ for active stream S2 is $n_1$=30,003. The RTP header extension sequence number of the switching packet of active stream S1 is 0, and the RTP header extension of the switching packet of active stream S2 is 1. Therefore, correction factor $\Delta$ for active stream S1 is $n_1$=10,000−$n_1$=30,000+0=−20,000, and correction factor $\Delta$ for active stream S2 is $n_1$=20,001−$n_1$=30,003+1=−10,003.

In the illustrated example, the corrected downstream sequence numbers for packets in active stream S1 are $g_1$=10,000−(−20,000)=30,000, $g_2$=10,001−(−20,000)=30,001, $g_3$=10,002−(−20,000)=30,002. The corrected downstream sequence numbers for packets in active stream S1 are $g_4$=20,001−(−10,003)=30,004, $g_5$=20,000−(−10,003)=30,003, $g_6$=20,002−(−10,003)=30,005, $g_7$=20,003−(−10,003)=30,006.

The receiver endpoint may use the corrected downstream sequence numbers of the packets.

Modifications, additions, or omissions may be made to system 40 without departing from the scope of the invention. The components of system 40 may be integrated or separated according to particular needs. Moreover, the operations of system 40 may be performed by more, fewer, or other modules. Additionally, operations of system 40 may be performed using any suitable logic.

FIG. 3 is a call flow diagram illustrating one embodiment of a method for marking keyframes that may be used with system 40 of FIG. 2.

Steps 52 and 56 describe sender endpoints sending streams of packets numbered with endpoint sequence numbers. Endpoint A sends stream A to entry media switch 1 at step 52. Endpoint B sends stream B to entry media switch 2 at step 56.

Steps 58 through 64 describe renumbering the packets by assigning upstream sequence numbers to the packets. The upstream sequence numbers may include an embedded RTP header extension. At step 58, media switch 1 renumbers the packets of stream A to yield media stream S1. Media switch 1 sends media stream S1 to network 30 at step 60. At step 62, media switch 2 renumbers packets of stream B to yield media stream S2. Media switch 2 sends media stream S2 to network 30 at step 64.

Network 30 combines media stream S1 and S2 to form a combined stream N at step 66. When combining media streams, network 30 may mix up the order of the packets. In the illustrated embodiment, network 30 sends combined stream $N_j$ to non-entry media switch 3 at step 68.

Non-entry media switch 3 renumbers the packets of the combined stream N at step 70 by assigning downstream sequence numbers to yield combined stream C. Renumbering the packets in a sequential order may reduce the possibility that packets will be dropped. Non-entry media switch 3 sends combined stream C to receiver endpoint F at step 72.

Receiver endpoint F corrects the order of the packets at step 74 to return the packets to the original order of the packets as sent by sender endpoints. Receiver endpoint F may then communicate the combined stream D to other system modules at step 78.

Modifications, additions, or omissions may be made to the method without departing from the scope of the invention. The method may include more, fewer, or other steps. Additionally, steps may be performed in any suitable order without departing from the scope of the invention.

Certain embodiments of the present invention may provide a number of technical advantages. A technical advantage of one embodiment may be that an entry media switch examines a stream to identify keyframes. When a keyframe is detected, the entry media switch marks the keyframe to notify non-entry media switches of the keyframe. Thus, non-entry media switches do not have to examine the stream for keyframes.

Another technical advantage of one embodiment may be that a subsequent non-entry entry media switch renumbers the packets in a sequential order. Renumbering the packets in a sequential order may reduce the possibility that packets will be dropped. Another technical advantage of one embodiment may be a receiver endpoint applies a reordering scheme to return the packets to the original order.

Numerous other changes, substitutions, variations, alterations, and modifications may be ascertained by those skilled in the art. The present invention encompasses all such changes, substitutions, variations, alterations, and modifications as falling within the spirit and scope of the appended claims.

What is claimed is:

1. A method for marking a keyframe of a media stream in a communication system, comprising:
    performing, by each entry media switch of one or more entry media switches, the following:
        facilitating communication of a plurality of packets in a plurality of media streams from a plurality of endpoints, each endpoint configured to support communication of packets, each packet having an endpoint sequence number assigned by the endpoint;
        selecting an endpoint of the plurality of endpoints as an active speaker of a conference session, an active media stream of the active speaker to be sent to the other endpoints;
        receiving the active media stream from the selected endpoint, the active media stream comprising a keyframe operable to be decoded independently of any other frame, the keyframe indicating a switch to the active speaker;
        assigning, by the each entry media switch, an upstream sequence number to each packet of the active media stream such that each packet has an upstream sequence number and an endpoint sequence number, the upstream sequence number used to establish the order of the packets; and
    notifying a downstream media switch of the keyframe by marking the keyframe with a keyframe indicator and sending the active media stream to the downstream media switch in an output media stream to allow the down stream media switch configured to receive a combined stream comprising the one or more output media streams and the one or more keyframe indicators of the one or more output media streams, the down stream media switch configured to apply a reordering scheme to establish the order of the packets of the combined stream in accordance with the one or more keyframe indicators by calculating a corrected downstream sequence number from a difference between an upstream sequence number and a correction factor, the correction factor determined from a function of an upstream sequence number of a switching packet of the media stream of the active speaker, a downstream sequence number of the switching packet, and a header extension sequence number of the switching packet.

2. The method of claim 1, wherein marking the keyframe with the keyframe indicator further comprises:
    placing a particular value in a header extension of an upstream sequence number assigned to the keyframe.

3. The method of claim 1, further comprising:
    receiving the one or more output media streams; and
    combining the one or more output media streams to yield a combined stream.

4. The method of claim 1, further comprising:
    receiving a combined stream comprising the one or more output media streams, the combined stream comprising a plurality of packets of the one or more output media streams; and
    assigning each packet of the plurality of packets a downstream sequence number in accordance with the order of the plurality of packets in the combined stream.

5. The method of claim 1, further comprising:
    receiving a combined stream comprising the one or more output media streams, the combined stream comprising the one or more keyframe indicators of the one or more output media streams; and
    establishing the order of the packets of the combined stream in accordance with the one or more keyframe indicators.

6. A system for marking a keyframe of a media stream in a communication system, comprising:

one or more entry media switches in communication with a plurality of endpoints of a conference session, an entry media switch of the one or more entry media switches operable to:
  facilitate communication of a plurality of packets in a plurality of media streams from the plurality of endpoints, each endpoint configured to support communication of packets, each packet having an endpoint sequence number assigned by the endpoint;
  select an endpoint of the plurality of endpoints as an active speaker of the conference session, an active media stream of the active speaker to be sent to the other endpoints;
  receive the active media stream from the selected endpoint, the active media stream comprising a keyframe operable to be decoded independently of any other frame, the keyframe indicating a switch to the active speaker;
  assign, by the each entry media switch, an upstream sequence number to each packet of the active media stream such that each packet has an upstream sequence number and an endpoint sequence number, the upstream sequence number used to establish the order of the packets; and
  notify a downstream media switch of the keyframe by marking the keyframe with a keyframe indicator and sending the active media stream to the downstream media switch in an output media stream to allow the down stream media switch configured to receive a combined stream comprising the one or more output media streams and the one or more keyframe indicators of the one or more output media streams, the down stream media switch configured to apply a reordering scheme to establish the order of the packets of the combined stream in accordance with the one or more keyframe indicators by calculating a corrected downstream sequence number from a difference between an upstream sequence number and a correction factor, the correction factor determined from a function of an upstream sequence number of a switching packet of the media stream of the active speaker, a downstream sequence number of the switching packet, and a header extension sequence number of the switching packet.

7. The system of claim 6, the entry media switch of the one or more entry media switches further operable to mark the keyframe with the keyframe indicator by:
  placing a particular value in a header extension of an upstream sequence number assigned to the keyframe.

8. The system of claim 6, further comprising a network device operable to:
  receive the one or more output media streams from the one or more entry media switches; and
  combine the one or more output media streams to yield a combined stream.

9. The system of claim 6, further comprising a non-entry media switch operable to:
  receive a combined stream comprising the one or more output media streams, the combined stream comprising a plurality of packets of the one or more output media streams from the one or more entry media switches; and
  assign each packet of the plurality of packets a downstream sequence number in accordance with the order of the plurality of packets in the combined stream.

10. The system of claim 6, further comprising a receiver endpoint operable to:
  receive a combined stream comprising the one or more output media streams, the combined stream comprising the one or more keyframe indicators of the one or more output media streams from the one or more entry media switches; and
  establish the order of the packets of the combined stream in accordance with the one or more keyframe indicators.

11. A non-transitory computer readable medium encoded with a software for marking a keyframe of a media stream in a communication system, the software operable to:
  performing, by each entry media switch of one or more entry media switches, the following:
    facilitate communication of a plurality of packets in a plurality of media streams from a plurality of endpoints, each endpoint configured to support communication of packets, each packet having an endpoint sequence number assigned by the endpoint;
    select an endpoint of the plurality of endpoints as an active speaker of a conference session, an active media stream of the active speaker to be sent to the other endpoints;
    receive the active media stream from the selected endpoint, the active media stream comprising a keyframe operable to be decoded independently of any other frame, the keyframe indicating a switch to the active speaker;
    assign, by the each entry media switch, an upstream sequence number to each packet of the active media stream such that each packet has an upstream sequence number and an endpoint sequence number, the upstream sequence number used to establish the order of the packets; and
    notify a downstream media switch of the keyframe by marking the keyframe with a keyframe indicator and sending the active media stream to the downstream media switch in an output media stream to allow the down stream media switch configured to receive a combined stream comprising the one or more output media streams and the one or more keyframe indicators of the one or more output media streams, the down stream media switch configured to apply a reordering scheme to establish the order of the packets of the combined stream in accordance with the one or more keyframe indicators by calculating a corrected downstream sequence number from a difference between an upstream sequence number and a correction factor, the correction factor determined from a function of an upstream sequence number of a switching packet of the media stream of the active speaker, a downstream sequence number of the switching packet, and a header extension sequence number of the switching packet.

12. The computer readable medium of claim 11, further operable to mark the keyframe with the keyframe indicator by:
  placing a particular value in a header extension of an upstream sequence number assigned to the keyframe.

13. The computer readable medium of claim 11, further operable to:
  receive the one or more output media streams; and
  combine the one or more output media streams to yield a combined stream.

14. The computer readable medium of claim 11, further operable to:

receive a combined stream comprising the one or more output media streams, the combined stream comprising a plurality of packets of the one or more output media streams; and assign each packet of the plurality of packets a downstream sequence number in accordance with the order of the plurality of packets in the combined stream.

15. The computer readable medium of claim 11, further operable to:

receive a combined stream comprising the one or more output media streams, the combined stream comprising the one or more keyframe indicators of the one or more output media streams; and establish the order of the packets of the combined stream in accordance with the one or more keyframe indicators.

16. A system for marking a keyframe of a media stream in a communication system, comprising:

means for performing, by each entry media switch of one or more entry media switches, the following:

facilitating communication of a plurality of packets in a plurality of media streams from a plurality of endpoints, each endpoint configured to support communication of packets, each packet having an endpoint sequence number assigned by the endpoint;

selecting an endpoint of the plurality of endpoints as an active speaker of a conference session, an active media stream of the active speaker to be sent to the other endpoints;

receiving the active media stream from the selected endpoint, the active media stream comprising a keyframe operable to be decoded independently of any other frame, the keyframe indicating a switch to the active speaker;

assigning, by the each entry media switch, an upstream sequence number to each packet of the active media stream such that each packet has an upstream sequence number and an endpoint sequence number, the upstream sequence number used to establish the order of the packets; and notifying a downstream media switch of the keyframe by marking the keyframe with a keyframe indicator and sending the active media stream to the downstream media switch in an output media stream to allow the down stream media switch configured to receive a combined stream comprising the one or more output media streams and the one or more keyframe indicators of the one or more output media streams, the down stream media switch configured to apply a reordering scheme to establish the order of the packets of the combined stream in accordance with the one or more keyframe indicators by calculating a corrected downstream sequence number from a difference between an upstream sequence number and a correction factor, the correction factor determined from a function of an upstream sequence number of a switching packet of the media stream of the active speaker, a downstream sequence number of the switching packet, and a header extension sequence number of the switching packet.

17. A method for marking a keyframe of a media stream in a communication system, comprising:

performing, by each entry media switch of one or more entry media switches, the following:

facilitating communication of a plurality of packets in a plurality of media streams from a plurality of endpoints, each endpoint configured to support communication of packets, each packet having an endpoint sequence number assigned by the endpoint;

selecting an endpoint of the plurality of endpoints as an active speaker of a conference session, an active media stream of the active speaker to be sent to the other endpoints;

receiving the active media stream from the selected endpoint, the active media stream comprising a keyframe operable to be decoded independently of any other frame, the keyframe indicating a switch to the active speaker;

assigning, by the each entry media switch, an upstream sequence number to each packet of the active media stream such that each packet has an upstream sequence number and an endpoint sequence number, the upstream sequence number used to establish the order of the packets; and notifying a downstream media switch of the keyframe by marking the keyframe with a keyframe indicator and sending the active media stream to the downstream media switch in an output media stream, marking the keyframe with the keyframe indicator further comprising placing a particular value in a header extension of an upstream sequence number assigned to the keyframe;

receiving the one or more output media streams;

combining the one or more output media streams to yield a combined stream;

receiving a combined stream comprising the one or more output media streams, the combined stream comprising a plurality of packets of the one or more output media streams; and assigning each packet of the plurality of packets a downstream sequence number in accordance with the order of the plurality of packets in the combined stream;

receiving the combined stream comprising the one or more output media streams, the combined stream comprising the one or more keyframe indicators of the one or more output media streams; and applying a reordering scheme to establish the order of the packets of the combined stream in accordance with the one or more keyframe indicators by calculating a corrected downstream sequence number from a difference between an upstream sequence number and a correction factor, the correction factor determined from a function of an upstream sequence number of a switching packet of the media stream of the active speaker, a downstream sequence number of the switching packet, and a header extension sequence number of the switching packet.

18. A method comprising:

performing, by each entry media switch of one or more entry media switches, the following:

facilitating communication of a plurality of packets in a plurality of media streams from a plurality of endpoints, each packet having an endpoint sequence number assigned by an endpoint;

selecting an endpoint of the plurality of endpoints as an active speaker of a conference session, an active media stream of the active speaker to be sent to the other endpoints;

receiving the active media stream from the selected endpoint, the media stream comprising a keyframe indicating a switch to the active speaker and operable to be decoded independently of any other frame;

assigning, by the each entry media switch, an upstream sequence number to each packet of the active media stream such that the each packet has an upstream sequence number and an endpoint sequence number, the upstream sequence number used to establish the order of the packets; and marking the keyframe with a keyframe indicator and sending the media stream to a downstream media switch in an output media stream, the output media stream to be combined with one or more other output media streams to yield a combined stream comprising the keyframe indicators of the output media streams, the keyframe indicators used to establish the order of the packets of the combined stream by calculating a corrected downstream sequence number using the upstream sequence numbers to allow the down stream media switch to apply a reordering scheme to establish the order of the packets of the combined stream by calculating a corrected downstream sequence number from a difference between an upstream sequence number and a correction factor, the correction factor determined from a function of an upstream sequence number of a switching packet of the media stream of the active speaker, a downstream sequence number of the switching packet, and a header extension sequence number of the switching packet.

19. A method comprising:

receiving a combined stream comprising one or more output media streams, each output media stream comprising a plurality of packets, each packet having an endpoint sequence number assigned by an endpoint and an upstream sequence number assigned by an entry media switch, each output media stream comprising a keyframe indicator indicating a keyframe, the keyframe indicating a switch to an active speaker and operable to be decoded independently of any other frame;

determining a correction factor from a function of an upstream sequence number of a switching packet of an output media stream;

calculating a corrected downstream sequence number for each packet from a difference between an upstream sequence number of the each packet and the correction factor; and establishing the order of the packets of the combined stream in accordance with the corrected downstream sequence numbers.

20. A non-transitory computer readable medium encoded with a software for marking a keyframe of a media stream in a communication system, the software operable to:

receive a combined stream comprising one or more output media streams, each output media stream comprising a plurality of packets, each packet having an endpoint sequence number assigned by an endpoint and an upstream sequence number assigned by an entry media switch, each output media stream comprising a keyframe indicator indicating a keyframe, the keyframe indicating a switch to an active speaker and operable to be decoded independently of any other frame;

determine a correction factor from a function of an upstream sequence number of a switching packet of an output media stream;

calculate a corrected downstream sequence number for each packet from a difference between an upstream sequence number of the each packet and the correction factor; and establish the order of the packets of the combined stream in accordance with the corrected downstream sequence numbers.

21. An apparatus comprising one or more processors configured to:

receive a combined stream comprising one or more output media streams, each output media stream comprising a plurality of packets, each packet having an endpoint sequence number assigned by an endpoint and an upstream sequence number assigned by an entry media switch, each output media stream comprising a keyframe indicator indicating a keyframe, the keyframe indicating a switch to an active speaker and operable to be decoded independently of any other frame;

determine a correction factor from a function of an upstream sequence number of a switching packet of an output media stream;

calculate a corrected downstream sequence number for each packet from a difference between an upstream sequence number of the each packet and the correction factor; and establish the order of the packets of the combined stream in accordance with the corrected downstream sequence numbers.

* * * * *